United States Patent
Jain (10) Patent No.: US 10,970,308 B2
(45) Date of Patent: Apr. 6, 2021

(54) METHOD AND SYSTEM FOR DECENTRALIZED IMAGE MANAGEMENT

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 82 days.

(21) Appl. No.: 16/412,691

(22) Filed: May 15, 2019

(65) Prior Publication Data
US 2019/0266175 A1  Aug. 29, 2019

Related U.S. Application Data

(63) Continuation of application No. 15/604,630, filed on May 24, 2017, now Pat. No. 10,339,154.

(51) Int. Cl.
G06F 16/27 (2019.01)
G06T 11/60 (2006.01)
G06F 16/51 (2019.01)
G06T 11/00 (2006.01)

(52) U.S. Cl.
CPC ............. *G06F 16/27* (2019.01); *G06F 16/51* (2019.01); *G06T 11/00* (2013.01); *G06T 11/60* (2013.01)

(58) Field of Classification Search
CPC ............. H04L 45/7453; H04L 61/2514; H04L 43/0876; H04L 67/1002
See application file for complete search history.

(56) References Cited

U.S. PATENT DOCUMENTS

| | | | | |
|---|---|---|---|---|
| 6,725,221 B2* | 4/2004 | Murakami | ............... | G06F 16/40 709/201 |
| 7,107,423 B2* | 9/2006 | Blair | ................... | G06F 16/9574 711/167 |
| 7,458,002 B2* | 11/2008 | Fischer | .................... | G06F 21/74 714/746 |
| 7,529,723 B2* | 5/2009 | Howard | .................. | G06F 16/10 |
| 7,634,562 B2* | 12/2009 | Litofsky | .............. | H04L 43/0852 709/224 |
| 7,710,978 B2* | 5/2010 | Signaoff | ................. | H04L 69/08 370/395.5 |
| 7,802,065 B1* | 9/2010 | Eatough | .............. | G06F 16/9574 711/158 |
| 8,510,569 B2* | 8/2013 | Smith | ..................... | G06F 21/57 713/190 |

(Continued)

*Primary Examiner* — Yosef Kassa
(74) *Attorney, Agent, or Firm* — Buckley, Maschoff & Talwalkar LLC (57) ABSTRACT

Various embodiments of systems and methods for decentralized image management are described herein. The method includes generating, distributing, and retrieving images on peer-to-peer network. Request for generating an image is received. Multiple components/layers of a to-be-generated image is identified. A layer is stored as a file. Files corresponding to the layers are packaged as an image file representing the image. The packaged image file and/or files of respective layers are distributed across the network, e.g., across a plurality of available nodes upon receiving a distribution command/request. When a request for retrieving the image is received, the nodes storing the multiple layers of the image are identified. The layers are retrieved from the identified multiple nodes. Using the retrieved multiple layers, the image is recreated/generated.

20 Claims, 9 Drawing Sheets (56) References Cited

U.S. PATENT DOCUMENTS

| | | | | |
|---|---|---|---|---|
| 8,605,730 B2* | 12/2013 | Signaoff | ............... | H04L 69/08 |
| | | | | 370/395.5 |
| 8,813,239 B2* | 8/2014 | Tibeica | ............... | G06Q 10/107 |
| | | | | 726/26 |
| 9,088,611 B2* | 7/2015 | Jagadeeswaran | ..... | H04L 69/163 |
| 9,342,273 B1* | 5/2016 | Kumar | ...................... | G06F 8/20 |

* cited by examiner

| TOTAL NUMBER OF LAYERS IN IMAGE I2 310 | 3 |
| --- | --- |
| HASH ADDRESS OF FIRST_LAYER | 098F6BCD4621D373CADE4E832627B4F6 |
| HASH ADDRESS OF SECOND_LAYER | D2CD7D3456D61F28B455FF0F6571D173 |
| HASH ADDRESS OF THIRD_LAYER | 400996F5DFC835909F7C73FA3978745D |
| HASH ADDRESS OF IMAGE I2 330 | A7416041DAE52C82916E95BF64E3A149 |

300

320 (brace around the three layer hash rows)

| NODE 520 | IMAGE/LAYER 530 |
|---|---|
| N1 (172.16.12.9) | a7416041dae52c82916e95bf64e3a149 |
| N2 (204.12.16.10) | 098f6bcd4621d373cade4e832627b4f6 <br> a7416041dae52c82916e95bf64e3a150 |
| N3 (172.16.12.10) | D2cd7d3456d61f28b455ff0f6571d173 <br> a7416041dae52c82916e95bf64e3a150 |
| N4 (213.14.13.11) | 40099६f5dfc835909f7c73fa3978745d <br> a7416041dae52c82916e95bf64e3a150 |
| NN (213.14.14.11) | a7416041dae52c82916e95bf64e3a149 |

METHOD AND SYSTEM FOR DECENTRALIZED IMAGE MANAGEMENT

CROSS-REFERENCE TO RELATED APPLICATIONS

The present application is a continuation application of co-pending U.S. patent application Ser. No. 15/604,630, filed May 24, 2017, the contents of which are incorporated by reference herein for all purposes.

BACKGROUND

In context of computer science, an image may refer to a replica or representation of content(s) of a storage device. For example, the image may be the replica of an application stored within the storage device. Often, the image may be represented as a file which includes the content of the storage device. For example, image may be the file that includes binaries and configuration of the application. The image (e.g., the file) may be downloaded and used to recreate the application. The image may be executed within a virtual machine (VM) or a container based technology (e.g., Docker®, an open source software platform, which may be used for executing applications/images). In both, the VM and the container based technology, the images may be retrieved or downloaded from a central repository which may be maintained by a private or a corporate entity.

Storing and downloading images from the central repository may not be favored because the images may not be downloaded and/or executed when the central repository is unavailable (e.g., due to technical issues, maintenance, or network issues). Therefore, the images are non-persistent and may not be retrieved or downloaded when required. Also, the images may be available for a time period decided by the central repository provider (e.g., the private or corporate entity). Further, a single (central) repository may be overburdened with requests (e.g., to retrieve images), therefore, the speed and efficiency (e.g., to download and execute image) decreases. Furthermore, the central repository may not be scaled beyond a limit considering hardware constraints and also, scaling the central repository may be an arduous task.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Embodiments of techniques for decentralized image management are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Image" refers to a replica or a representation of contents of a storage device, e.g., the replica of an application stored within the storage device. An image may include various components, e.g., configurable components and/or executable components. A configurable and/or executable component of the image may be termed as a layer of the image. For example, a configuration package, binaries of an application, an executable module, etc., may be different layers of the image. The image may be represented as a file. Each layer may be represented as a separate file and a combination of all such files or layers forms the image. With reference to a Docker®, the image may refer to a "snapshot of a container including an executable entity (e.g., a module, an application, etc.)". The executable entity may be a file including components such as code, runtime environment (i.e., configuration of hardware and software such as a type of a processor, operating system (OS), etc.), tools (e.g., to debug or support the executable entity), and libraries, etc., to execute the executable entity.

"Node" refers to a device, a data point, or a unit that has an internet protocol (IP) address in a network, e.g., a computer, a cell phone, a printer, etc. Each node has an unique IP address. An image or a layer of the image may be stored on a node. In an aspect, the node may have predefined privileges, e.g., an amount of memory or storage of the node that may be used by other nodes on the network, restriction (s) for accessing stored images or files by one or more other nodes, etc.

"Distributed network" refers to peer-to-peer (P2P) network which is created when two or more devices (e.g., nodes) are connected to share resources without involving a central server. In a distributed or P2P network, the devices (e.g., the peers or nodes) may be communicatively coupled (e.g., through wired or wireless communication technologies, such as Bluetooth, Wi-Fi, Universal Serial Bus (USB), infrared and the like) to transfer or share resources, e.g., images or files, etc. The devices or nodes in a distributed network may form a distributed file system.

"Decentralized file system engine" or "distribution engine" refers to a component to distribute, manage, and maintain images or files across various nodes of the distributed or P2P network. A distribution engine enables storing and sharing images or files across various nodes. Therefore, a distribution engine may provide a decentralized method of storing, sharing, or distributing images or files across a distributed or P2P network. A distribution engine may include peer-to-peer hypermedia (e.g., graphics, audio, video, text, hyperlinks, etc.) distribution protocol. A distribution engine may comprise an interplanetary file system (IPFS) which is a peer-to-peer distributed file system to connect plurality of devices (e.g., peers). A distribution engine may distribute an image across a distributed or P2P network, e.g., by storing the image on two or more available nodes. Different layers of the image may be stored or distributed over one or more nodes. In an aspect, there may be a single distribution engine for the distributed network. The distribution engine may be a separate entity communicatively coupled to the nodes of the distributed network or it may be installed or downloaded within a node itself. In an aspect, when a node where the distribution engine is installed blows out, becomes unavailable, or defective, the distribution engine may be unattached from that defective node (e.g., using a command: unattach <distribution engine name or ID> from <node IP Address>) and may be installed at another node of the distributed network. In another aspect, there may be multiple distribution engines within the distributed network, e.g., individual nodes may have their respective distribution engine installed for catering the requests generating from the individual nodes. In an aspect, a node may use the distribution engine installed within another node (e.g., by specifying name or ID of distribution engine along with the service request).

"Content-addressable storage" or CAS refers to a mechanism for storing information that can be retrieved based on content rather than storage location. It is typically used for high-speed storage and retrieval of content. Based upon a content of an image or file, a hash address may be generated for the image or file. In an aspect, when an image is generated, its corresponding hash address is also generated. The hash address may be used to access the image. In an embodiment, each layer of the image may have its unique hash address (based upon content) and each layer may be referred based upon its hash address.

"Meta-image file" or "meta file" refers to a file storing information (metadata) related to an image. For example, a meta-image file may include information such as number of layers in an image, hash address of each layer of the image, hash address of the image, etc. A meta-image file of an image may also have unique hash address. A distribution engine may refer to a meta-image file of an image to retrieve information related to the image, e.g., number of layers within the image, hash addresses of each layer, and the hash address of the image, etc.

"Distribution table" refers to a table which stores information related to distribution of image and/or its layers across a distributed network. For example, a distribution table stores information about node(s) where an image and/or its various layers are stored. A distribution table may provide a lookup service. In an aspect, a distribution table may be a Distributed Hash Table (DHT). A distribution table may map keys to values (key, value). In an embodiment, a key may be image's or image's layer identifier (ID) such as a hash address of the image or image's layer and a value may be ID of node, e.g., an IP address of the node where the corresponding image is stored. A participating node can efficiently retrieve a value associated with a key from a distribution table. A distribution table may be maintained or stored within a distribution engine and/or one or more nodes. A node and/or a distribution engine may refer to a distribution table to identify nodes and the images stored at the nodes, e.g., to retrieve an image. In an embodiment, a distribution table is updated based upon addition and/or removal of a device (nodes), and/or addition, deletion and/or updation of images. In an embodiment, a distribution engine keeps different instances or copies of a distribution table synchronized. For example, an instances of a distribution table stored at one or more nodes may be synchronized with the latest/updated instance of the distribution table which may be stored within a distribution engine.

Embodiments provide decentralize image management, e.g., by distributing images (e.g., Docker® images) across P2P network. The images may not be confined or restricted to one device or location (e.g., central repository or server). The images are distributed across the network and therefore, are readily and easily available. If a device and/or a central server is unavailable (e.g., due to network issues), the images are still available from various other devices (nodes) on the P2P network. Therefore, the images are persistent and the unavailability of one device does not affect the availability and accessibility of the images. Also, as the images are distributed across the network, the images retrieval (downloading) may be more efficient and fast. Moreover, the process of storing and uploading images is more efficient and fast as there are many devices or locations where the images may be uploaded or stored. Distribution engine automatically determines the loads, storage capacity, and availability of various devices (nodes) and accordingly, determines the devices where the images may be efficiently uploaded or stored. In various embodiments, an image may be stored on granular levels, e.g., different layers of the image may be stored or uploaded on different devices (nodes), based upon the availability and storage capacity of the devices/nodes. The distribution engine may also determine the device(s) from which the image may be retrieved or downloaded efficiently and in less time. An image, image's layer, or various images and image layers may be uploaded and/or downloaded in parallel as multiple devices (nodes) are available. The devices or nodes may be scaled further and this allows handling continual node arrivals, departures, and failures.

Figure 1:
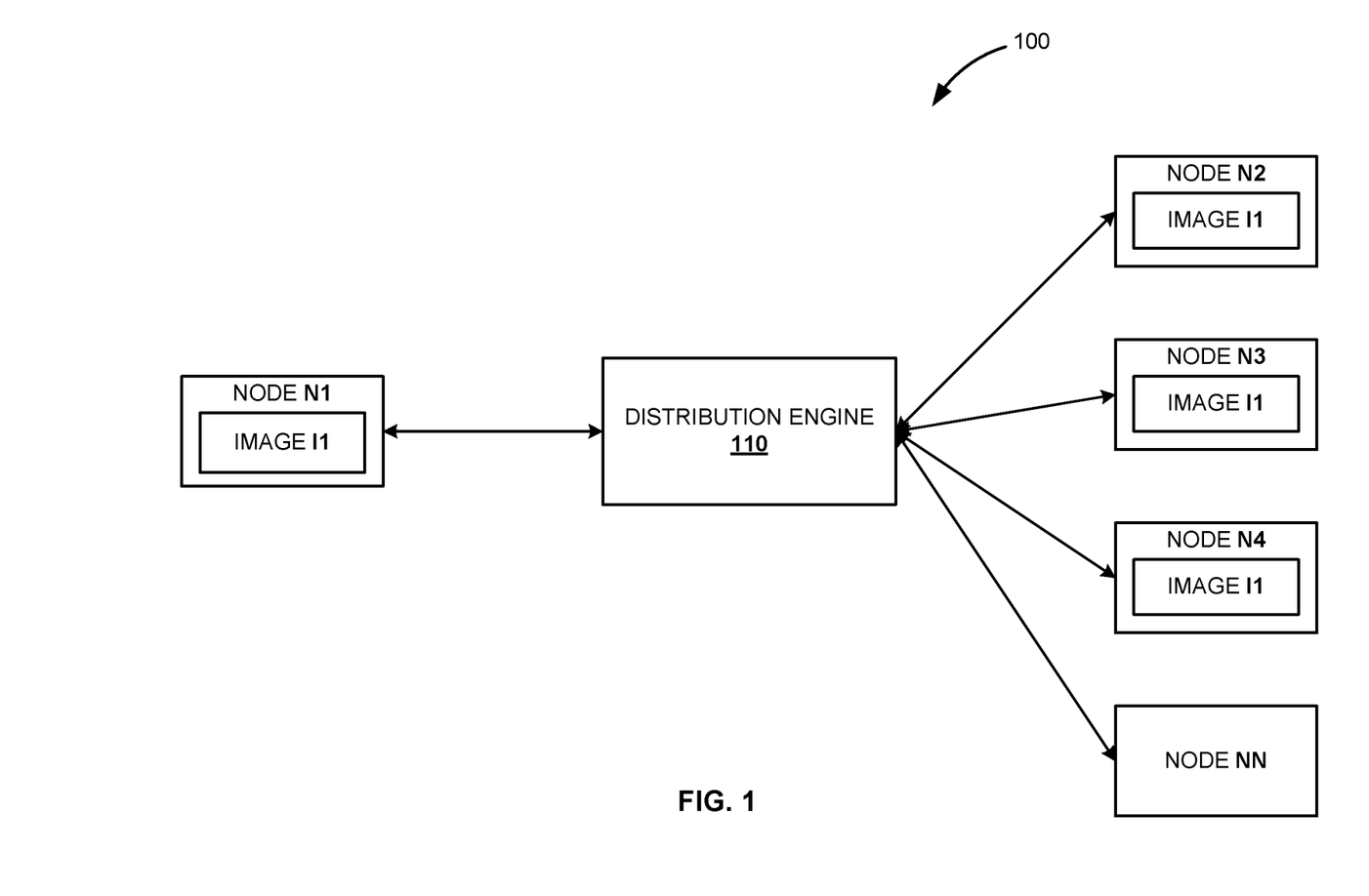
FIG. 1 is a block diagram illustrating components for decentralized image management, according to an embodiment.

FIG. 1 is a block diagram illustrating exemplary environment 100 for decentralized image management, according to an embodiment. The environment 100 illustrates a distributed network with multiple nodes (e.g., nodes N1, N2, N3, N4, and NN) and distribution engine 110. A node may be a device, e.g., a computer, a cell phone, a printer, etc. Each node (N1, N2, N3, N4, and NN) has its unique IP address. The nodes N1, N2, N3, N4, and NN may be configured to generate, store, and/or retrieve images. An image may be generated at one of the nodes N1, N2, N3, N4 and NN using a build or create command. In an embodiment, once a "build image" command is entered, a prompt is displayed to enter a name of the image to be build or generated. An image may be generated at any node. For example, image I1 may be generated at node N1. The generated image (e.g., the image I1) may be distributed across the other nodes (e.g., the nodes N2, N3, and N4) of the distributed network. In an embodiment, the term distribute refers to upload, send, or store. The distribution engine 110 distributes the image (e.g., the image I1) across the other nodes (e.g., the nodes N2, N3, and N4). In an embodiment, the distribution engine 110 may be a separate entity communicatively coupled to the nodes (e.g., N1, N2, N3, N4, and NN). In an embodiment, the distribution engine 110 distributes the image upon receiving a request (e.g., an upload or push command) from a user. For example, the user may provide a push command (PUSH IMAGE I1) through the device or node N1. Based upon the command, the distribution engine 110 determines the devices (nodes) which may be free or have sufficient storage space to store the image I1. Based upon the availability and the storage capacity of the nodes, the distribution engine 110 distributes the image I1 to at least one of the available nodes. For example, if the nodes N2, N3, and node N4 have sufficient storage space and are available for storing the image I1 (node NN may not have sufficient permanent memory or storage (e.g., hard disk space or ROM) to store the image), the distribution engine 110 may distribute or upload the image I1 to the nodes N2, N3, and N4. The stored image (e.g., the image I1) may be retrieved from one or more of the nodes where it is stored (e.g., N1, N2, N3, and/or N4). A user may provide a command (e.g., a pull command) to retrieve an image. For example, if a user at node NN wants to retrieve the image I1 (i.e., temporary download the image in RAM, e.g., for viewing or editing, etc.), it may provide a command "PULL I1" Based upon the pull command, the distribution engine 110 determines the nodes which store the image I1 (e.g., the nodes N2, N3, and N4) and may retrieve the image I1 from one or more of the determined nodes N2, N3, and/or N4, based upon the availability. For example, if the nodes N2 and N3 are overloaded and/or busy processing other tasks, the image I1 may be retrieved from the less busy node that is available, e.g., the node N4. In an embodiment, if a user at node N2 wants to retrieve the image I1, it may provide a command "PULL I1" and the image I1 may be readily retrieved as the image I1 is already stored or available at node N2.

An image may be generated at one or more of the nodes N1, N2, N3, N4, and NN. The image may be generated upon receiving a command, e.g., "build image" command. In an embodiment, the "build image" command may be provided or entered by a user. For example, the user may provide a "build image" command by selecting a "build image" option from a menu or by selecting a "build image" icon. When the "build image" command is provided, a representation of the content of a memory (e.g., storage device) is generated and saved as an image. In an embodiment, a name of the content of memory (e.g., component, module, application, etc.) for which the image is to be generated is provided along with the "build image" command such as "build image of the application XYZ." In an embodiment, a user may provide the name to the image, e.g., through a prompt, while saving the image. In an embodiment, once the "build image" command is provided, a prompt may be displayed to enter the name of the image to be build or generated. Once the name is provided by the user, an image building tool (e.g., a Docker®) generates the image.

Figure 2:
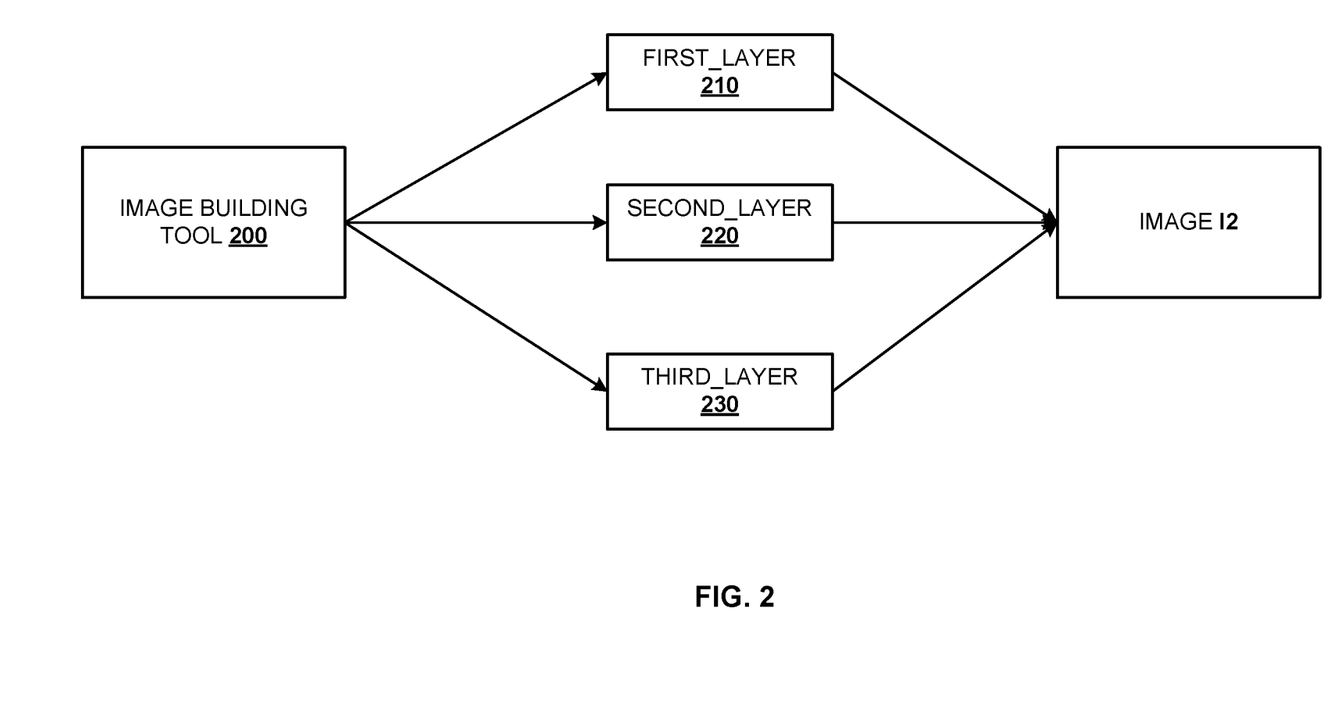
FIG. 2 is a block diagram illustrating an image building tool for generating an image comprising various layers, according to an embodiment.

FIG. 2 illustrates an exemplarily image building tool 200 to generate images, e.g., an image I2, upon receiving the image building (e.g., "build image") command. In an embodiment, an image may be generated with one or more layers. For example, image I2 may be generated with three layers: first_layer 210, second_layer 220, and third_layer 230. A layer may be a component of the image, e.g., code related to the image, runtime environment for executing the image, tools to debug or support the execution of the image, or libraries for supporting the image, etc. Once the layers (e.g., 210-230) are generated, the image building tool 200 generates a corresponding unique identifier (e.g., hash address) for each layer. For example, hash_address1 (i.e., "098f6bcd4621d373cade4e832627b4f6"), hash_address2 (i.e., "d2cd7d3456d61f28b455ff0f6571d173"), and hash_address3 (i.e., "400996f5dfc835909f7c7 3fa3978745d"), may be generated for the respective layers, i.e., the first_layer 210, the second_layer 220, and the third_layer 230. In an embodiment, a layer may be represented as a file with corresponding hash_address. Once the layers 210-230 are generated, the image building tool 200 generates a final image I2, e.g., by combining all the three layers 210-230. In an embodiment, combining the three layers refers to "packaging the files corresponding to all three layers into a single file." In an embodiment, packaging may refer to storing together. The single file represents the final image I2. The final image I2 may be assigned a unique identifier or hash_addressI2 (e.g., "a7416041dae52c82916e95bf64e3a149").

In an embodiment, the image building tool 200 generates a meta file corresponding to the generated image (e.g., the image I2). The meta file includes information (metadata) related to the image, e.g., number of layers in the image, hash addresses of the layers of the image, hash address of the image, etc. The image (e.g., the image I2) may be accessed, recreated, and/or retrieved (i.e., various layers of the image may be identified, accessed, and/or retrieved) using information from its meta file. For example, the image I2 (various layers of the image I2) may be accessed, retrieved, and/or recreated using information from its meta file. The meta file may also be assigned a hash address. For example, the meta file of the image I2 may be assigned the hash address "d7416041dae52c85916e94bf64e3a139". The meta file of the image may be accessed through its hash address.

Figure 3:
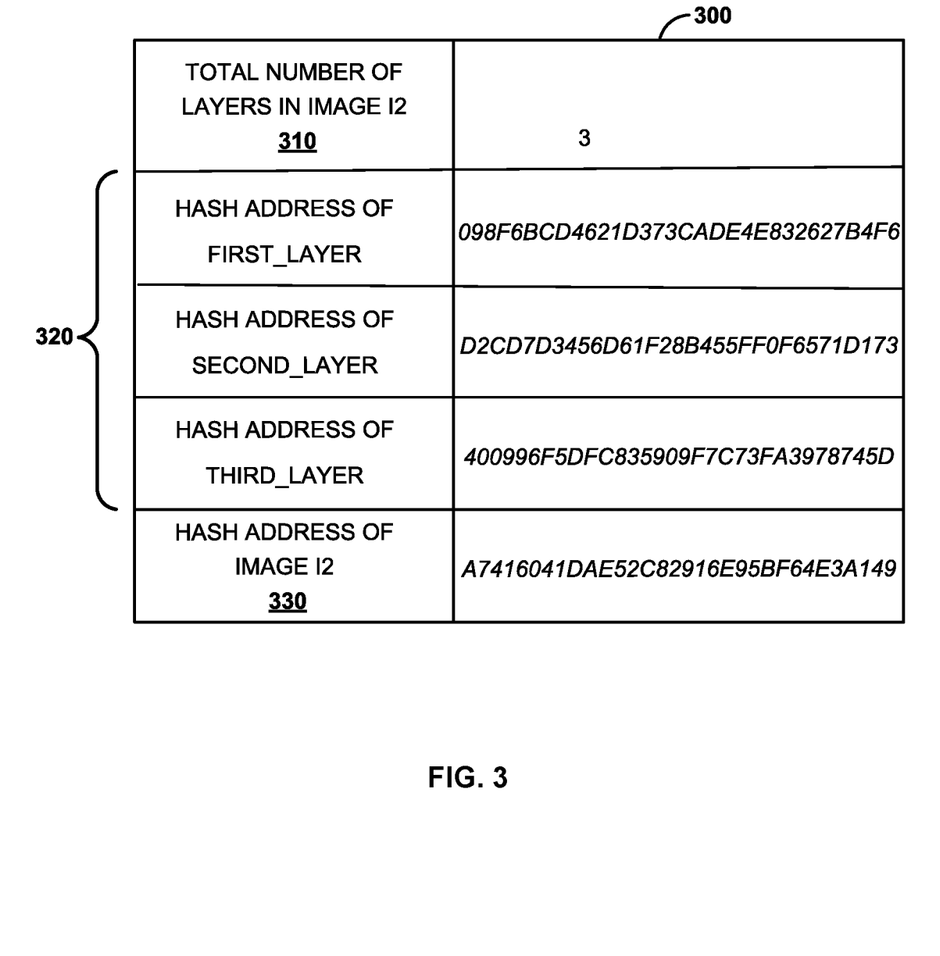
FIG. 3 is a table illustrating a template of a meta file corresponding to the generated image, according to an embodiment.

FIG. 3 illustrates tabular representation of template_of_meta_file 300 corresponding to the image I2. The template_of_meta_file 300 includes fields "total number of layers in image I2" 310 indicating the total number of layers comprising the image I2, "layers information" 320 indicating various layers of the image I2 and their corresponding hash addresses, and "hash address of the image I2" 330 indicating hash address of the image I2. Each field (310-330) has corresponding value. For example, the "total number of layers in image I2" 310 has a value '3' indicating that there are 3 layers in the image I2. The "layers information" 320 has values "098f6bcd4621d373cade4e832627b4f6", "d2cd7d3456d61f28b455ff0f6571d173", and "400996f5dfc835909f7c73fa3978745d" indicating the hash addresses of the corresponding three layers (i.e., first_layer, second_layer, and third_layer) comprising the image I2. The meta file may be generated automatically by the image building tool 200 (FIG. 2). In an embodiment, the meta file may be generated and stored by the distribution engine (e.g., distribution engine 110 of FIG. 1).

Figure 4:
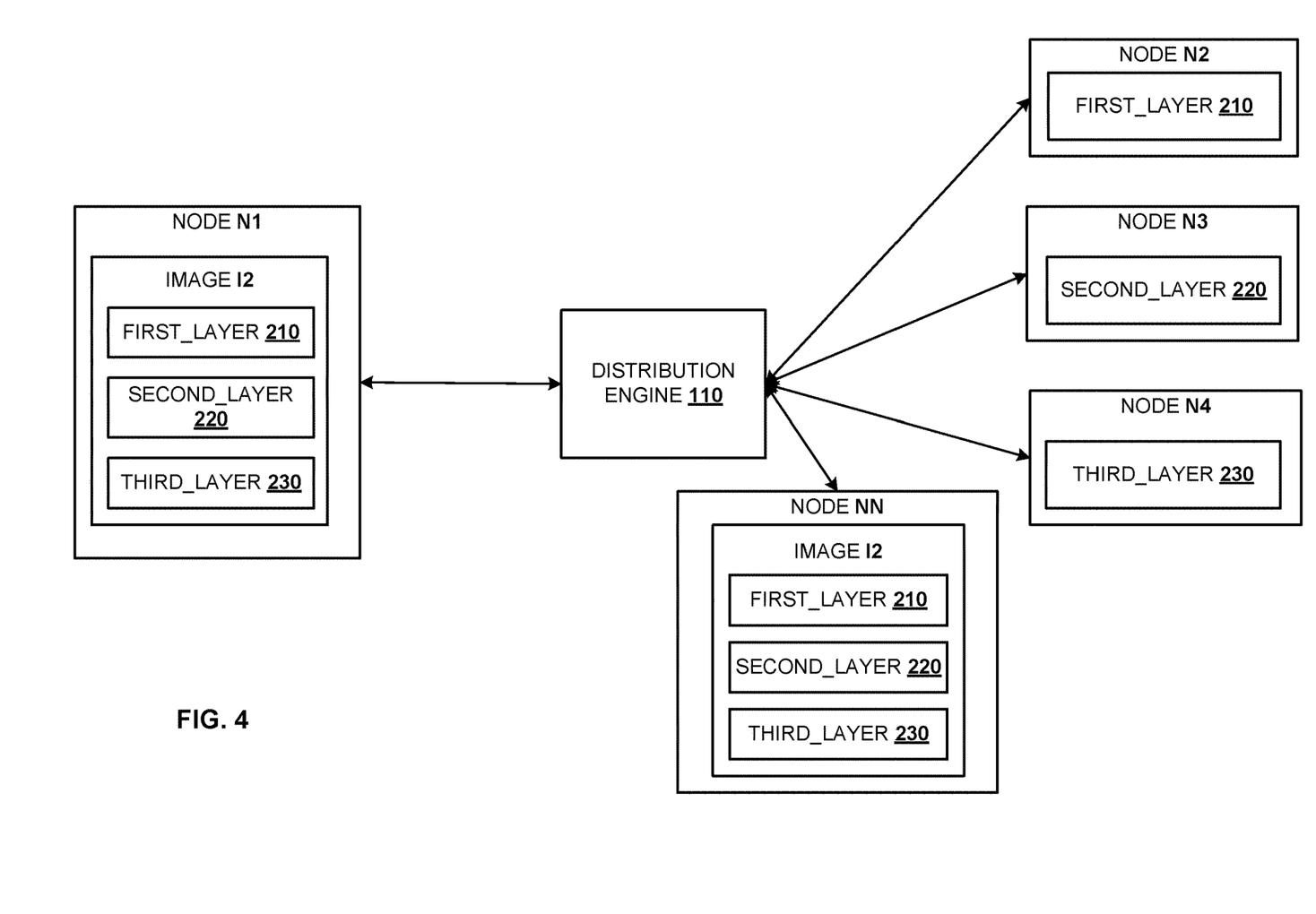
FIG. 4 is a block diagram illustrating distribution of the generated image and/or its various layers across the network, according to an embodiment.

Once the image (e.g., image I2) and its corresponding meta file is generated, the image may be distributed across the distributed or peer-to-peer (P2P) network. In an embodiment, for distributing the image (e.g., the image I2) across P2P network, a user may provide a command (e.g., push command). In an embodiment, in case of a Docker® image, an exemplarily push command may be:

"PUSH image I2" or "PUSH <hash address of image I2>", i.e., "PUSH a7416041dae52c9216e95bf64e3a149". Once the push command is triggered or initiated, the distribution engine 110 distributes or sends the image I2 to one or more nodes, e.g., nodes N2, N3, and N4 (FIG. 1). In an embodiment, the distribution engine 110 may distribute or send one or more layers of the image I2 to the one or more nodes. For example, as shown in FIG. 4, the first_layer 210 of image I2 may be sent to node N2 and the second_layer 220 of image I2 may be sent to node N3, and the third_layer 230 of image I2 may be sent to node N4. The layers (e.g., 210-230) may be distributed across the nodes based upon availability and storage capacity of the nodes. In an embodiment, the image I2 with all three layers 210-230 may be sent to one or more nodes, e.g., node NN. The distribution engine 110 may maintain a distribution table which includes information about the distribution of image and/or its different layers across the network or nodes.

Figure 5:
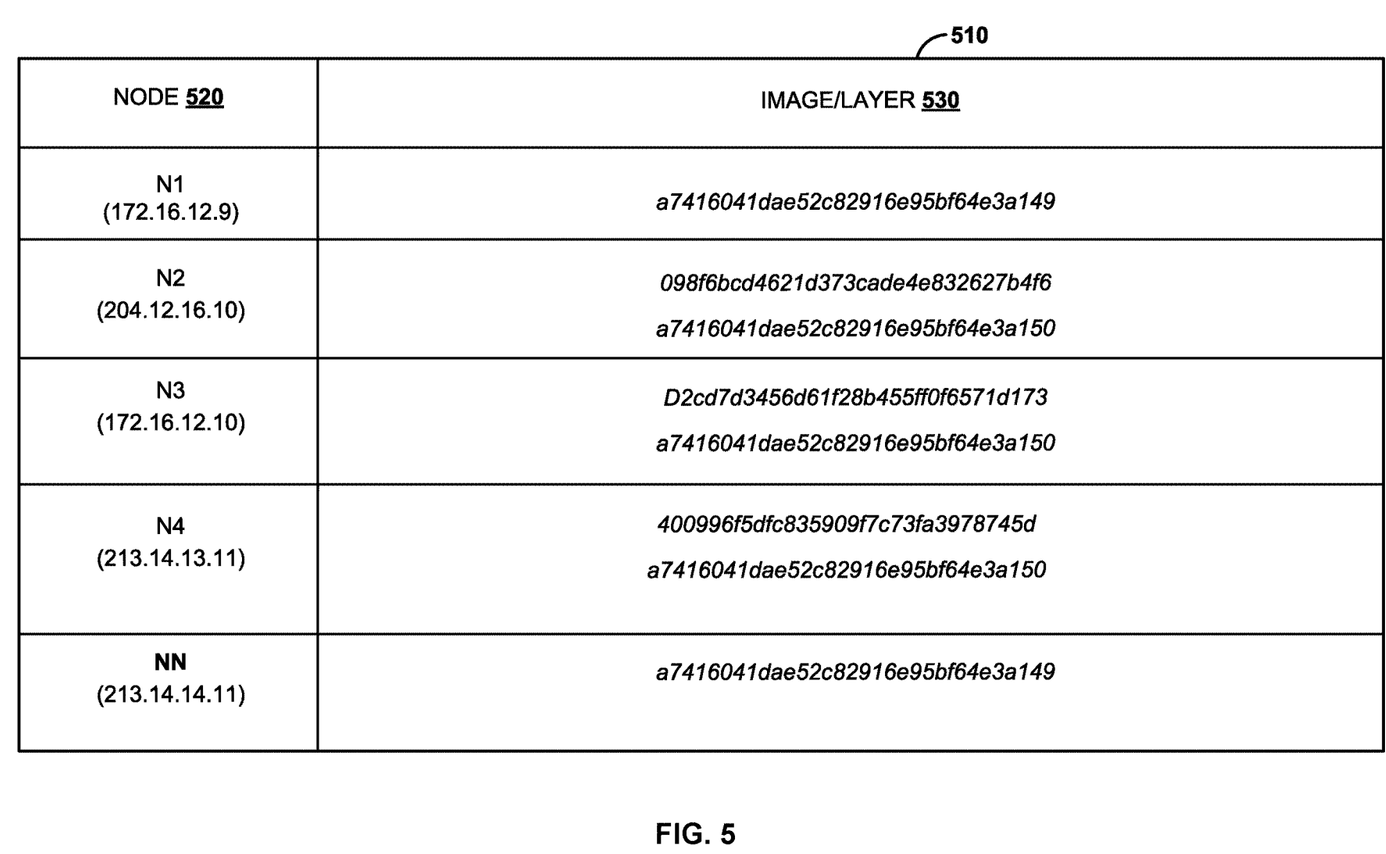
FIG. 5 is a distribution table indicating nodes and corresponding images and/or layers of the images stored at the nodes, according to an embodiment.

FIG. 5 illustrates exemplarily distribution table 510 storing distribution of images and layers of images across nodes N1, N2, N3, N4, and NN, according to an embodiment. The distribution table 510 includes fields "node" 520 and "image(s)/layer(s)" 530. The field "node" 520 indicates nodes (e.g., nodes IDs or IP addresses) and the field "image(s)/layer(s)" 530 indicates one or more images and/or layers of images (e.g., image's hash addresses) which are stored at corresponding nodes. For example, the node N1 (IP address:172.16.12.9) stores the image I2 (i.e., hash_address: a7416041dae52c82916e95bf64e3a149). The image I2 with hash_address a7416041dae52c82916e95bf64e3a149 implies the image I2 having the three layers included within to form a single image I2. The node N2 (IP address: 204.12.16.10) stores the first layer of the image I2 (i.e., hash address: 098f6bcd4621d373cade4e832627b4f6) and the image I1 (i.e., hash address: a7416041dae52c82916e95bf64e3a150). The node N3 (IP address: 172.16.12.10) stores the second layer of the image I2 (i.e., hash address: D2cd7d3456d61f28b455ff0f6571d173) and the image I1 (i.e., hash address: a7416041dae52c82916e95bf64e3a150). The node N4 (IP address: 213.14.13.11) stores the third layer of the image I2 (i.e., hash address: 400996f5dfc835909f7c73fa3978745d) and the image I1 (i.e., hash address: a7416041dae52c82916e95bf64e3a150) and the node NN stores the image I2 (i.e., hash address: a7416041dae52c82916e95bf64e3a149).

The distributed or stored image may be retrieved or downloaded, e.g., using a pull command. In an embodiment, in case of a Docker® image, an exemplarily pull command may be:

"PULL <hash address of meta file of the image>",
The distribution engine 110, reads the hash address of the meta file and identifies the one or more layers of the image. Once the image and its layers are identified, the distribution engine 110 refers to the distribution table (e.g., the distribution table 510 of FIG. 5) to identify node(s) where the image and/or its layers are stored. Once the nodes are identified, the distribution engine 110 retrieves the image and/or its layers from the one or more identified nodes. The distribution engine 110 combine the one or more retrieved layers to recreate the image. The recreated image is then sent to the device/node from which the pull command is received.

Figure 6:
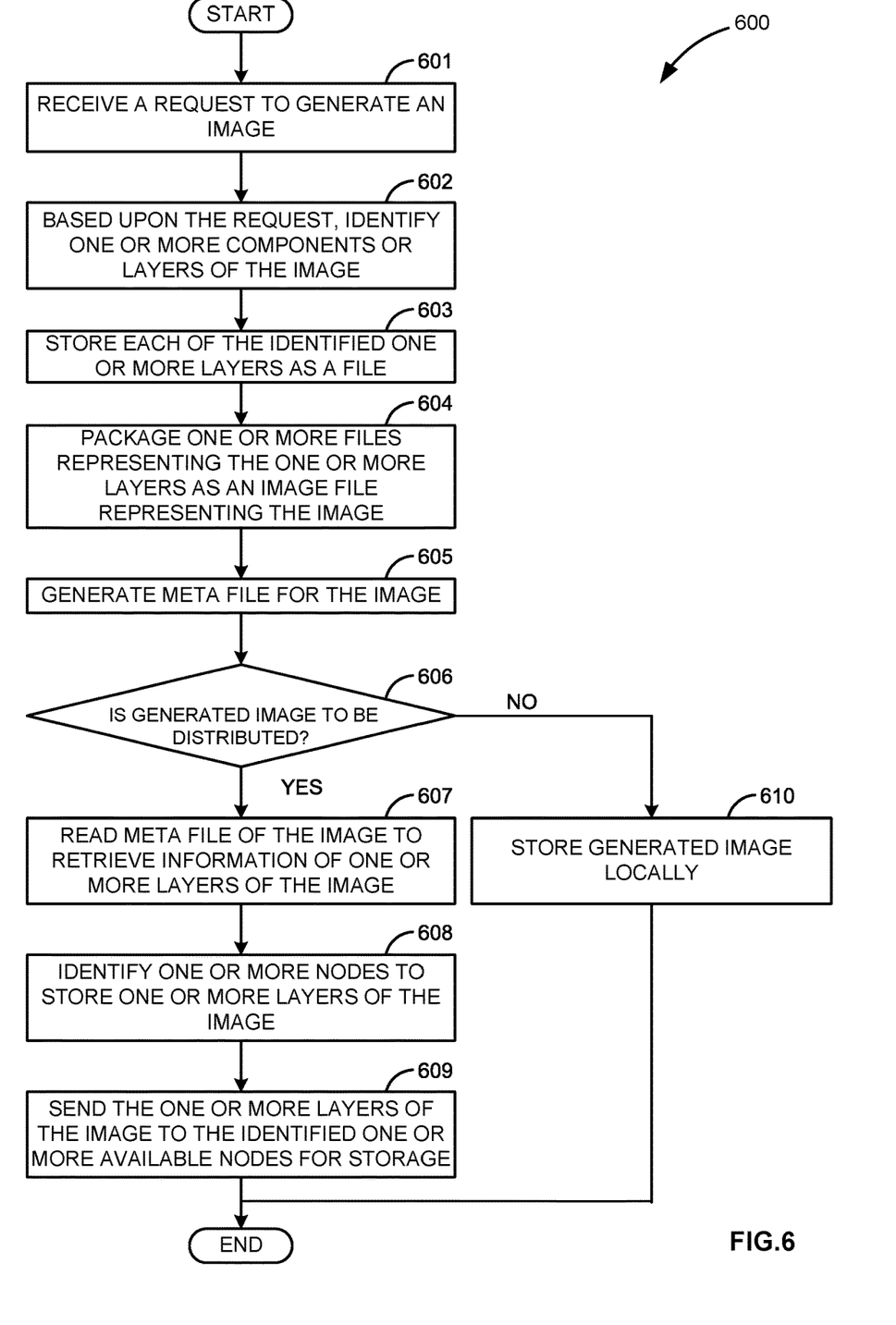
FIG. 6 is a flowchart illustrating a process of generating and distributing an image on peer-to-peer network, according to an embodiment.

FIG. 6 is a flowchart illustrating process 600 to generate and distribute an image on peer-to-peer (P2P) network, according to an embodiment. At 601, a request for generating the image is received. The request may be received at any of the nodes (e.g., the nodes N1, N2, N3, N4 and NN of FIG. 1) of the P2P network. At 602, based upon the request, one or more components or layers of the to-be generated image are identified. For example, if a request is to generate an image of an application, binaries and configuration (i.e., components) of the application is identified. At 603, each of the identified one or more layers are stored as a file. In an embodiment, a hash address may be generated for the each of the one or more files. At 604, the one or more files are packaged as an image file representing the image. In an embodiment, packaged refers to storing together or combined as a single unit. A hash address is generated for the image file representing the image. At 605, a meta file is generated for the image including information of the one or more layers of the image and the hash address of the image and its one or more layers. Once the image and its meta file is generated, at 606, it is determined if the generated image is to be distributed across the P2P network. When the generated image is to be distributed (606: YES), e.g., if a request to distribute the generated image is received, the meta file of the image is read to retrieve information of the one or more layers of the image at 607. At 608, one or more nodes available to store the one or more layers of the image is identified. At 609, the one or more layers of the image are sent to the identified one or more nodes for storage. In an embodiment, the distribution engine 110 (FIG. 1) determines and distributes the one or more layers of the image to the identified one or more nodes. In an embodiment, when all the identified one or more nodes are available and have storage capacity to store the one or more layers of the image, the one or more layers of the image may be pushed to all the identified one or more nodes. In an embodiment, the storage capacity required to store the first, second, third, etc., layers of the image is determined and one or more nodes that have required storage capacity is identified. From the identified one or more nodes, it is determined if different nodes are available for storing different layers of the image. When different nodes are available for storing different layers, the different layers are pushed/distributed to the different nodes. In case the nodes are not available and/or do not have required storage capacity to store the layers of the image, an error message (e.g., PUSH failure message) may be displayed. The user may then wait for sometimes and may again try to push or distribute the layers across the network until the distribution is successful. In an embodiment, when the generated image is not to be distributed (606: NO), e.g., if request to distribute the generated image is not received, at 610, the generated image may be stored locally at the node where it is generated.

Figure 7:
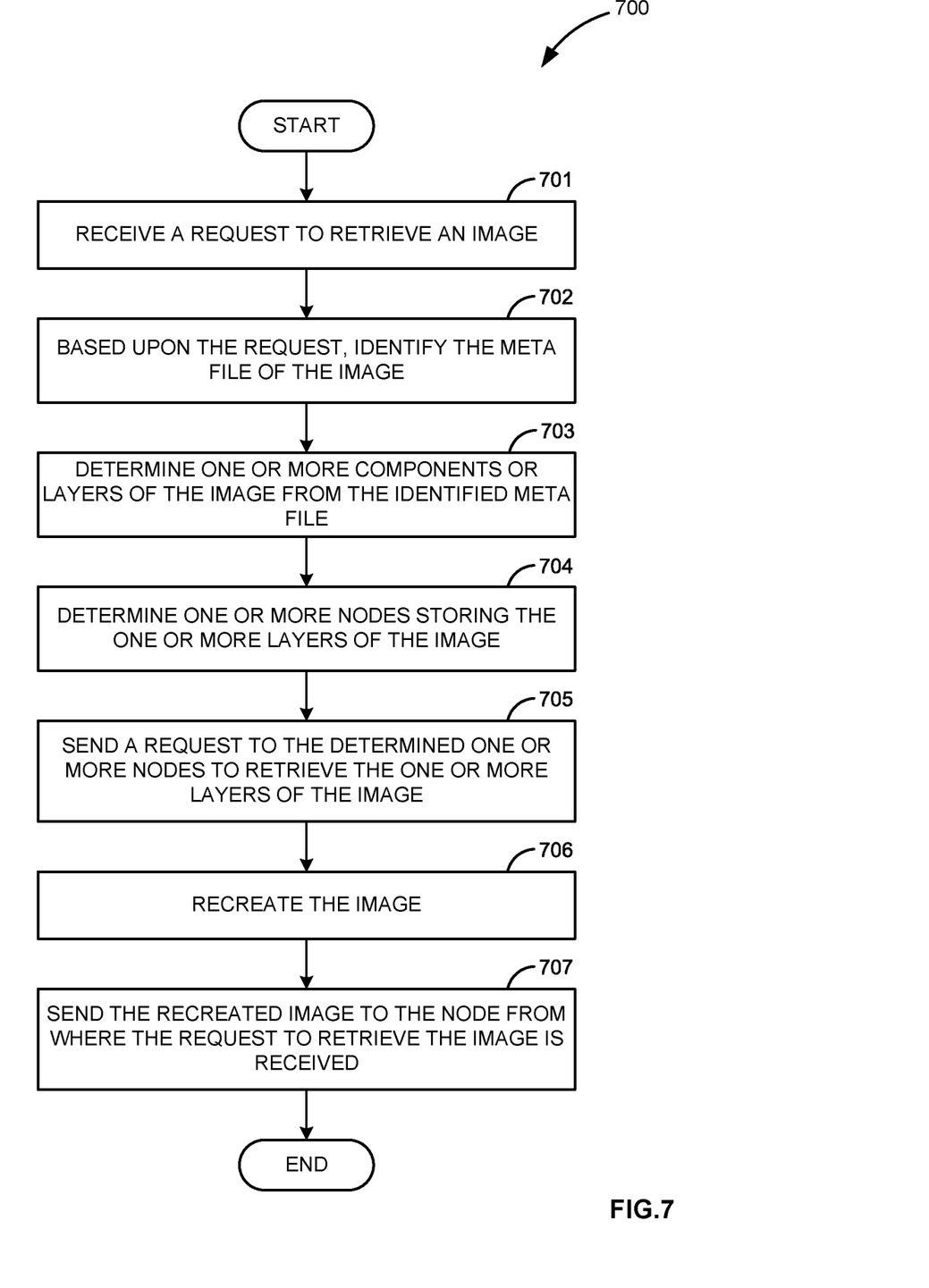
FIG. 7 is a flowchart illustrating a process of retrieving the distributed image from the peer-to-peer network, according to an embodiment.

FIG. 7 is a flowchart illustrating process 700 to retrieve the distributed/stored image from the peer-to-peer network, according to an embodiment. At 701, a request to retrieve the stored image is received. The request may be received by the distribution engine (e.g., the distribution engine 110 of FIG. 1) from one of the nodes of the peer-to-peer network. At 702, based upon the request, the distribution engine identifies the meta file of the image. In an embodiment, the request includes a hash address of the meta file of the image. At 703, from the identified meta file, one or more components or layers of the image are determined. At 704, one or more nodes storing the determined one or more layers of the image are identified. In an embodiment, the one or more nodes storing the one or more layers of the image are identified from a distribution table (e.g., the distribution table 510 of FIG. 5). At 705, a request is sent to the determined one or more nodes to retrieve the one or more layers of the image. In an embodiment, the one or more layers of the image refer to the one or more files representing the one or more layers of the image. At 706, the image is generated or recreated using the retrieved one or more layers (files) of the image, e.g., by the distribution engine. In an embodiment, recreating the image refers to packaging the one or more files (representing the one or more layers of the image) as a single image file representing the image. At 707, the generated image is sent to the one of the nodes from where the request to retrieve the image is received.

Figure 8:
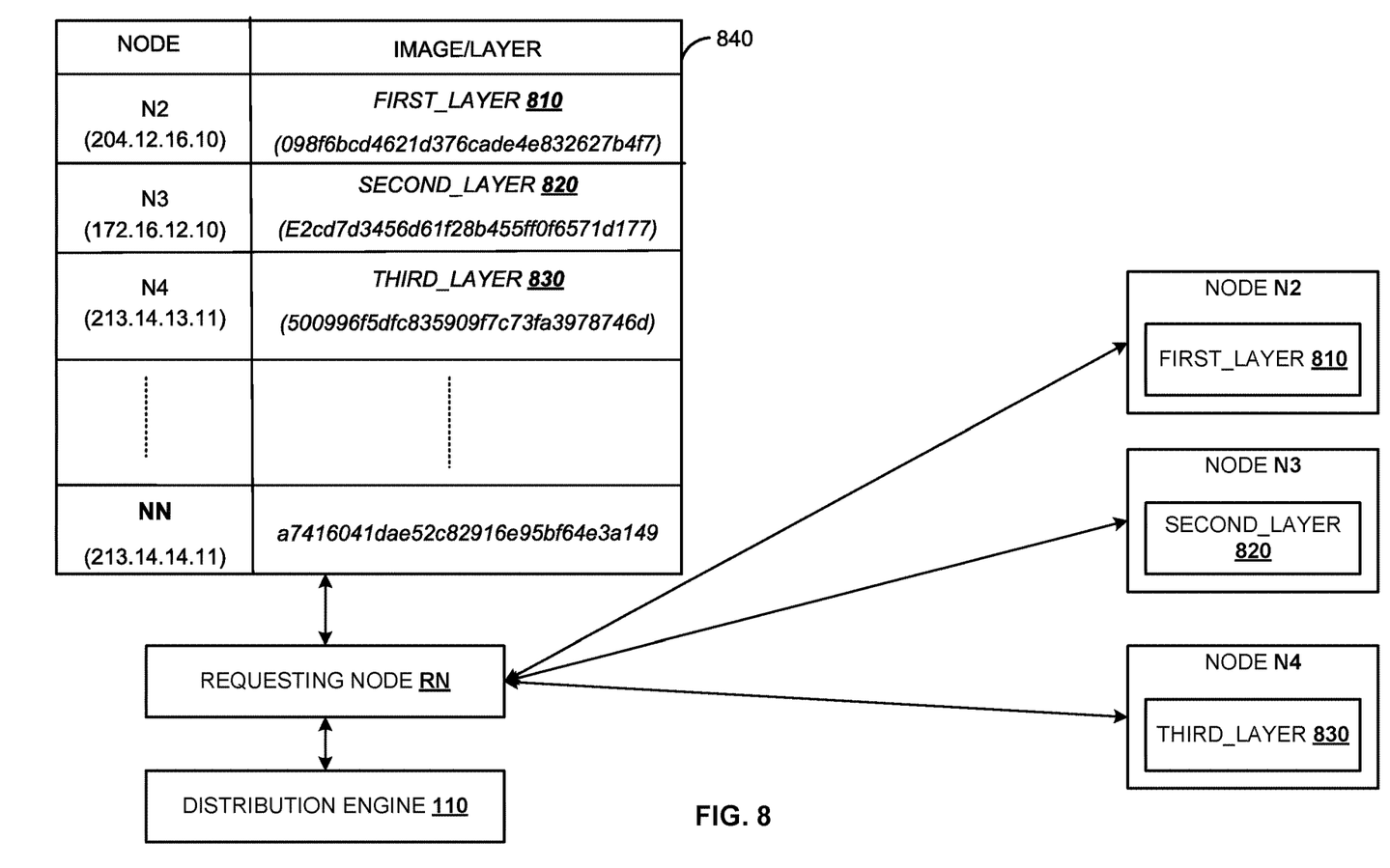
FIG. 8 is a block diagram illustrating retrieval or recreation of an image at a node of the distributed network, according to an embodiment.

FIG. 8 illustrates retrieval or recreation of an image (e.g., image I3) at a node (e.g., requesting node RN) of the distributed network, according to another embodiment. The requesting node RN sends a request or command (e.g., PULL I3) to the distribution engine 110 for retrieving the image I3 (e.g., PULL I3) from the distributed network. The image I3 may comprise three layers first_layer 810, second_layer 820, and third_layer 830. The first_layer 810 of the image I3 may be stored at the node N2 (IP address: 204.12.16.10), the second_layer 820 of the image I3 may be stored at the node N3 (IP address: 172.16.12.10), and the third_layer 830 of the image I3 may be stored at the node N4 (IP address: 213.14.13.11). Once the command (e.g., the PULL I3) is received by the distribution engine 110, the distribution engine retrieves meta data of the image (e.g., the image I3). The meta data refers to the information of the image such as the number of layers within the image, hash address of each layer of the image. The distribution engine 110 provides the meta data to the requesting node RN. For example, the distribution engine 110 may provide the information such as the image I3 comprises three layers, the first_layer 810 hash address: 098f6bcd4621d376cade4e832627b4f7, the second_layer 820 hash address: E2cd7d3456d61f28b455ff0f6571d177, and the third_layer 830 hash address: 500996f5dfc835909f7c73fa3978746d. Once the meta data is received by the node RN, the node RN refers to a distribution table 840. In an embodiment, the distribution table 840 may be stored at the node RN itself or the distribution table 840 be stored at a server, e.g., on cloud. In an embodiment, the distribution table 840 may be stored at the distribution engine 110 and the node RN may request the distribution engine 110 to provide the distribution table 840 to retrieve the information about distribution of the layers of the image I3 from the distribution table 840. From the distribution table 840, the information about distribution of the layers of the image I3 may be retrieved/determined. For example, it may be determined from the distribution table 840 that the first_layer 810 of the image I3 is stored at the node N2, the second_layer 820 of the image I3 is stored at the node N3, and the third_layer 830 of the image I3 is stored at the node N4. The node RN may send request to the respective nodes N2-N4 to retrieve the respective layers of the image, i.e., the layers 810-830. Once the layers 810-830 are retrieved from the nodes N2-N4, respectively, the node RN recreates or generates the original image I3 locally, e.g., by packaging (i.e., storing together, integrating, or combining) the the first_layer 810, the second_layer 820, and the third_layer 830 as a single image file representing the image I3. The generated image I3 may be executed, displayed, rendered, and/or installed, etc., at the node RN.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
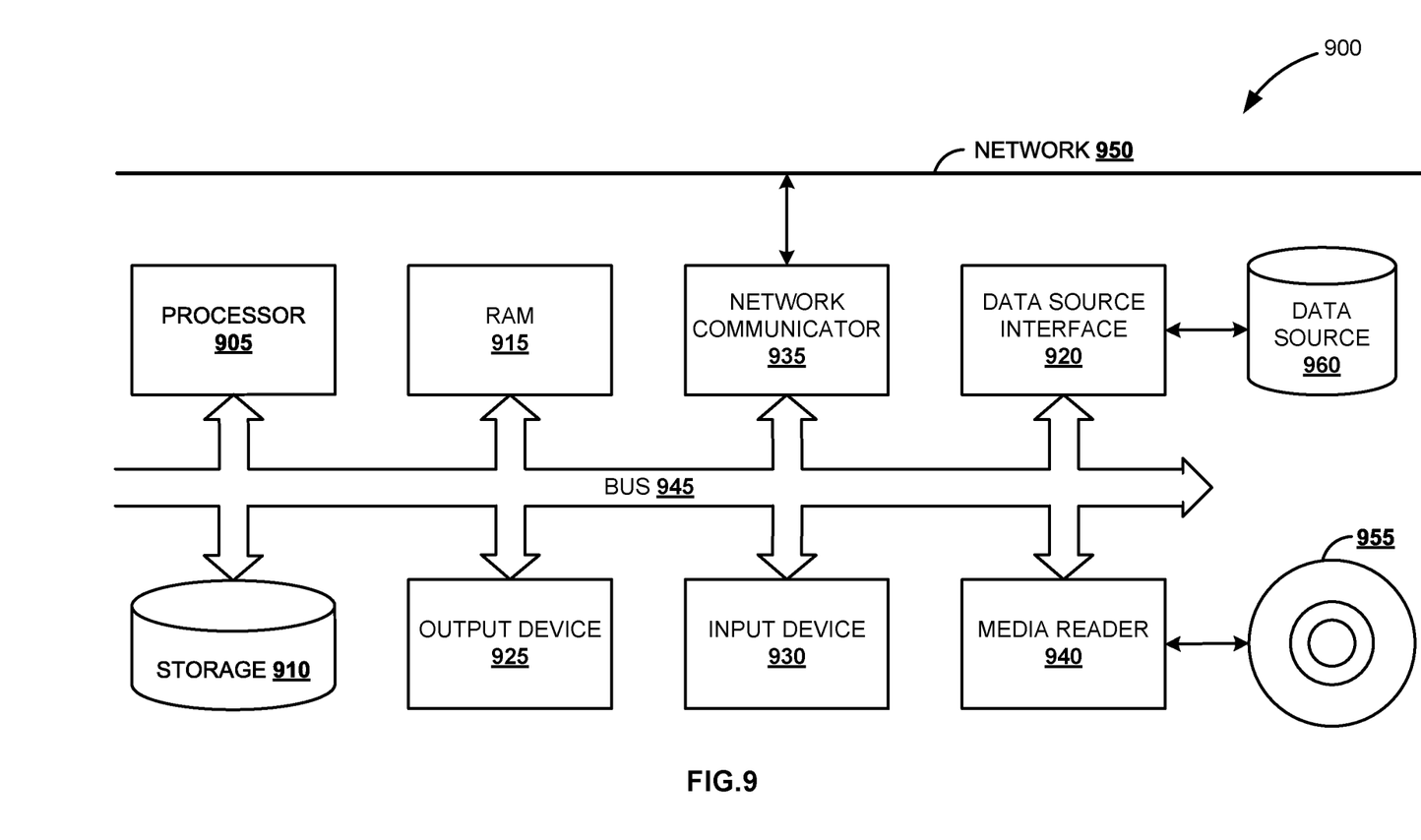
FIG. 9 is a block diagram illustrating an exemplary computer system, according to an embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. The output devices 925 and input devices 930 could be joined by one or more additional peripherals to further expand the capabilities of the computer system 900. A network communicator a may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
   receive a request to receive an image, the image including multiple layers;
   identify, based upon the request, metadata related to the image;
   determine, based on the identified metadata related to the image, the multiple layers of the image;
   determine multiple nodes storing the determined multiple layers of the image;
   retrieve the multiple layers of the image from at least one of the determined multiple nodes;
   generate a representation of the image using the retrieved multiple layers of the image; and
   send the generated representation of the image as a response to the request.

2. The non-transitory computer readable medium of claim 1, wherein the request includes at least one of:
   a hash address of the image; and
   a hash address of a meta file including the metadata of the image.

3. The non-transitory computer readable medium of claim 1, wherein the determination of the multiple layers of the image comprises a determination of hash addresses corresponding to the multiple layers of the image.

4. The non-transitory computer readable medium of claim 1, wherein the request comprises a Docker® pull command.

5. The non-transitory computer readable medium of claim 1, wherein a layer of the multiple layers of the image comprises one of a configurable component and executable component of the image.

6. The non-transitory computer readable medium of claim 1, wherein a layer of the multiple layers of the image is represented as a file and the generated representation of the image comprises multiple files representing the multiple layers of the image.

7. The non-transitory computer readable medium of claim 1, wherein the request is received from a node within a distributed peer-to-peer network.

8. The non-transitory computer readable medium of claim 1, wherein the multiple layers of the image and the metadata of the image are generated upon:
   receiving a request to create the image;
   identifying, based upon the request to create the image, multiple executable and configurable components of the image as the multiple layers of the image;
   storing each of the multiple layers of the image as a file;
   generating a hash address for the each of the one or more files;
   packaging the multiple files as an image file with a hash address representing the image; and
   generating a meta file including the metadata of the image indicating information about the multiple layers of the image and the hash addresses of the image.

9. The non-transitory computer readable medium of claim 8, wherein the generated multiple layers of the image are distributed across a network including the multiple nodes upon:
   receiving a request to distribute the image across the network;
   reading the meta file of the image to retrieve information of the multiple layers of the image;

identifying the multiple nodes available to store the multiple layers of the image; and
sending the multiple layers of the image to the identified multiple nodes for storage.

10. A computer-implemented method comprising:
receiving a request to receive an image, the image including multiple layers;
identify, based upon the request, a metadata related to the image;
determining, based on the identified metadata related to the image, the multiple layers of the image;
determining multiple nodes storing the determined multiple layers of the image;
retrieving the multiple layers of the image from at least one of the determined multiple nodes;
generating a representation of the image using the retrieved multiple layers of the image; and
sending the generated representation of the image as a response to the request.

11. The method of claim 10, wherein the multiple layers of the image and the metadata of the image are generated upon:
receiving a request to create the image;
identifying, based upon the request to create the image, one or more executable and configurable components of the image as the multiple layers of the image;
storing each of the multiple layers of the image as a file;
generating a hash address for the each of the multiple files;
packaging the multiple files as an image file with a hash address representing the image; and
generating a meta file including the metadata of the image indicating information about the multiple layers of the image and the hash addresses of the image.

12. The method of claim 11, wherein the generated multiple layers of the image are distributed across a network including the multiple nodes upon:
receiving a request to distribute the image across the network;
reading the meta file of the image to retrieve information of the multiple layers of the image;
identifying the one or more nodes available to store the multiple layers of the image; and
sending the multiple layers of the image to the identified one or more nodes for storage.

13. A computer system comprising:
at least one memory to store executable instructions; and
at least one processor communicatively coupled to the at least one memory, the at least one processor configured to execute the executable instructions to:
receive a request to receive an image, the image including multiple layers;
identify, based upon the request, a metadata related to the image;
determine, based on the identified metadata related to the image, the multiple layers of the image;
determine multiple nodes storing the multiple layers of the image;
retrieve the multiple layers of the image from at least one of the determined multiple nodes;
generate a representation of the image using the retrieved multiple layers of the image; and
send the generated representation of the image as a response to the request.

14. The system of claim 13, wherein the request includes at least one of:
a hash address of the image; and
a hash address of a meta file including the metadata of the image.

15. The system of claim 13, wherein the determination of the multiple layers of the image comprises a determine of hash addresses corresponding to the multiple layers of the image.

16. The system of claim 13, wherein a layer of the multiple layers of the image comprises one of a configurable component and executable component of the image.

17. The system of claim 13, wherein a layer of the multiple layers of the image is represented as a file and the generated representation of the image comprises multiple files representing the multiple layers of the image.

18. The system of claim 13, wherein the request is received from a node within a distributed peer-to-peer network.

19. The system of claim 13, wherein the multiple layers of the image and the metadata of the image are generated upon:
receiving a request to create the image;
identifying, based upon the request to create the image, multiple executable and configurable components of the image as the multiple layers of the image;
storing each of the multiple layers of the image as a file;
generating a hash address for the each of the multiple files;
packaging the multiple files as an image file with a hash address representing the image; and
generating a meta file including the metadata of the image indicating information about the multiple layers of the image and the hash addresses of the image.

20. The system of claim 19, wherein the generated multiple layers of the image are distributed across a network including the multiple nodes upon:
receiving a request to distribute the image across the network;
reading the meta file of the image to retrieve information of the multiple layers of the image;
identifying the multiple nodes available to store the multiple layers of the image; and
sending the multiple layers of the image to the identified multiple nodes for storage.

* * * * *